US010728199B2

(12) United States Patent
Grochocki, Jr. et al.

(10) Patent No.: US 10,728,199 B2
(45) Date of Patent: Jul. 28, 2020

(54) DELAYING SENDING AND RECEIVING OF MESSAGES

(71) Applicant: Microsoft Technology Licensing, LLC, Redmond, WA (US)

(72) Inventors: David Grochocki, Jr., Seattle, WA (US); Elizabeth Salowitz, Seattle, WA (US); Kshitij Mehta, Bothell, WA (US); Jeff West, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 15/887,449

(22) Filed: Feb. 2, 2018

(65) Prior Publication Data

US 2019/0245820 A1 Aug. 8, 2019

(51) Int. Cl.
G06F 15/16 (2006.01)
H04L 12/58 (2006.01)
G06Q 10/10 (2012.01)

(52) U.S. Cl.
CPC ........... *H04L 51/14* (2013.01); *G06Q 10/107* (2013.01); *H04L 51/22* (2013.01); *H04L 51/26* (2013.01); *H04L 51/30* (2013.01); *H04L 51/34* (2013.01); *H04L 51/38* (2013.01)

(58) Field of Classification Search
CPC ......... H04L 51/14; H04L 51/22; H04L 51/30; H04L 51/34; H04L 51/38; H04L 51/26; G06Q 10/107
USPC ........................................................ 709/206
See application file for complete search history.

(56) References Cited

U.S. PATENT DOCUMENTS

| | | | | |
|---|---|---|---|---|
| 5,646,982 A | * | 7/1997 | Hogan | H04M 3/53316 379/79 |
| 7,313,229 B1 | * | 12/2007 | Sherwood | H04M 3/53366 379/69 |
| 7,813,719 B2 | * | 10/2010 | Chiu | G06Q 10/109 455/412.2 |
| 8,073,495 B2 | | 12/2011 | Chiu et al. | |
| 8,170,580 B2 | * | 5/2012 | Dingler | H04W 4/02 455/456.1 |

(Continued)

FOREIGN PATENT DOCUMENTS

| WO | 2015152879 A1 | 10/2015 |
|---|---|---|
| WO | 2016022384 A1 | 2/2016 |

OTHER PUBLICATIONS

"International Search Report and Written Opinion Issued in PCT Application No. PCT/US2019/013887", dated Mar. 11, 2019, 12 Pages.

*Primary Examiner* — John B Walsh
(74) *Attorney, Agent, or Firm* — Ray Quinney & Nebeker; Tiffany Healy

(57) ABSTRACT

Methods and devices for verifying whether to send a message may include delaying, at an operating system executing on the computer device, sending of a message to at least one recipient based at least upon an associated delay period for the message. The methods and devices may include verifying a completion of the delay period and determining whether at least one override condition exists. The methods and devices may include altering a sending of the message when the at least one override condition occurred.

23 Claims, 5 Drawing Sheets

(56) References Cited

U.S. PATENT DOCUMENTS

| | | | |
|---|---|---|---|
| 9,043,414 B1* | 5/2015 | Rachabathuni | H04L 29/06 709/206 |
| 9,338,026 B2* | 5/2016 | Bandini | H04L 51/12 |
| 9,515,975 B2* | 12/2016 | Abuelsaad | H04L 51/20 |
| 9,838,853 B1* | 12/2017 | Bostick | H04W 4/12 |
| 2002/0087649 A1* | 7/2002 | Horvitz | G06Q 10/107 709/207 |
| 2007/0088788 A1* | 4/2007 | Goldberg | G06Q 10/107 709/206 |
| 2009/0044200 A1* | 2/2009 | Bordia | G06Q 10/107 719/314 |
| 2009/0150489 A1* | 6/2009 | Davis | G06Q 10/107 709/204 |
| 2011/0289162 A1* | 11/2011 | Furlong | H04L 51/12 709/206 |
| 2012/0094698 A1* | 4/2012 | Casto | H04W 4/14 455/456.4 |
| 2013/0096813 A1* | 4/2013 | Geffner | H04W 4/02 701/117 |
| 2013/0115927 A1* | 5/2013 | Gruber | H04W 4/16 455/414.1 |
| 2013/0150088 A1* | 6/2013 | Nasir | H04W 4/021 455/456.3 |
| 2013/0150099 A1* | 6/2013 | Chen | G06Q 10/107 455/466 |
| 2015/0271630 A1* | 9/2015 | Ferrara | H04W 4/02 455/456.3 |
| 2015/0355893 A1* | 12/2015 | Luk | G06F 8/62 717/178 |
| 2016/0036906 A1* | 2/2016 | Gopala | H04L 67/1023 709/203 |
| 2016/0156583 A1* | 6/2016 | Bank | H04L 51/32 709/206 |
| 2017/0149706 A1* | 5/2017 | Amble | H04L 51/066 |
| 2018/0150603 A1* | 5/2018 | Bullington | G16H 40/20 |

* cited by examiner

DELAYING SENDING AND RECEIVING OF MESSAGES

BACKGROUND

The present disclosure relates to delaying the sending of messages and/or receiving of messages.

Today it is possible to delay sending and/or receiving a message, such as but not limited to an email, for example, by time. A user may select a future date to send an email and the email will not be sent until that time is reached. It is also possible to control the frequency of syncing emails and messaging as well as muting or ignoring individual threads of messages. However, these are either perpetual or manual operations.

Thus, there is a need in the art for improvements in controlling the sending and/or receiving of messages.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and the processor. The operating system may be operable to delay sending of a message to at least one recipient based at least upon an associated delay period for the message; verify a completion of the delay period; determine whether at least one override condition exists; and alter a sending of the message when the at least one override condition occurred.

Another example implementation relates to a method for verifying whether to send a message from a computer device. The method may include delaying, at an operating system executing on the computer device, sending of a message to at least one recipient based at least upon an associated delay period for the message. The method may include verifying a completion of the delay period. The method may include determining whether at least one override condition exists. The method may also include altering a sending of the message when the at least one override condition occurred.

Another example implementation relates to computer-readable medium storing instructions executable by a computer device. The computer-readable medium may include at least one instruction for causing the computer device to delay sending of a message to at least one recipient based at least upon an associated delay period for the message. The computer-readable medium may include at least one instruction for causing the computer device to verify a completion of the delay period. The computer-readable medium may include at least one instruction for causing the computer device to determine whether at least one override condition exists. The computer-readable medium may include at least one instruction for causing the computer device to alter a sending of the message when the at least one override condition occurred.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
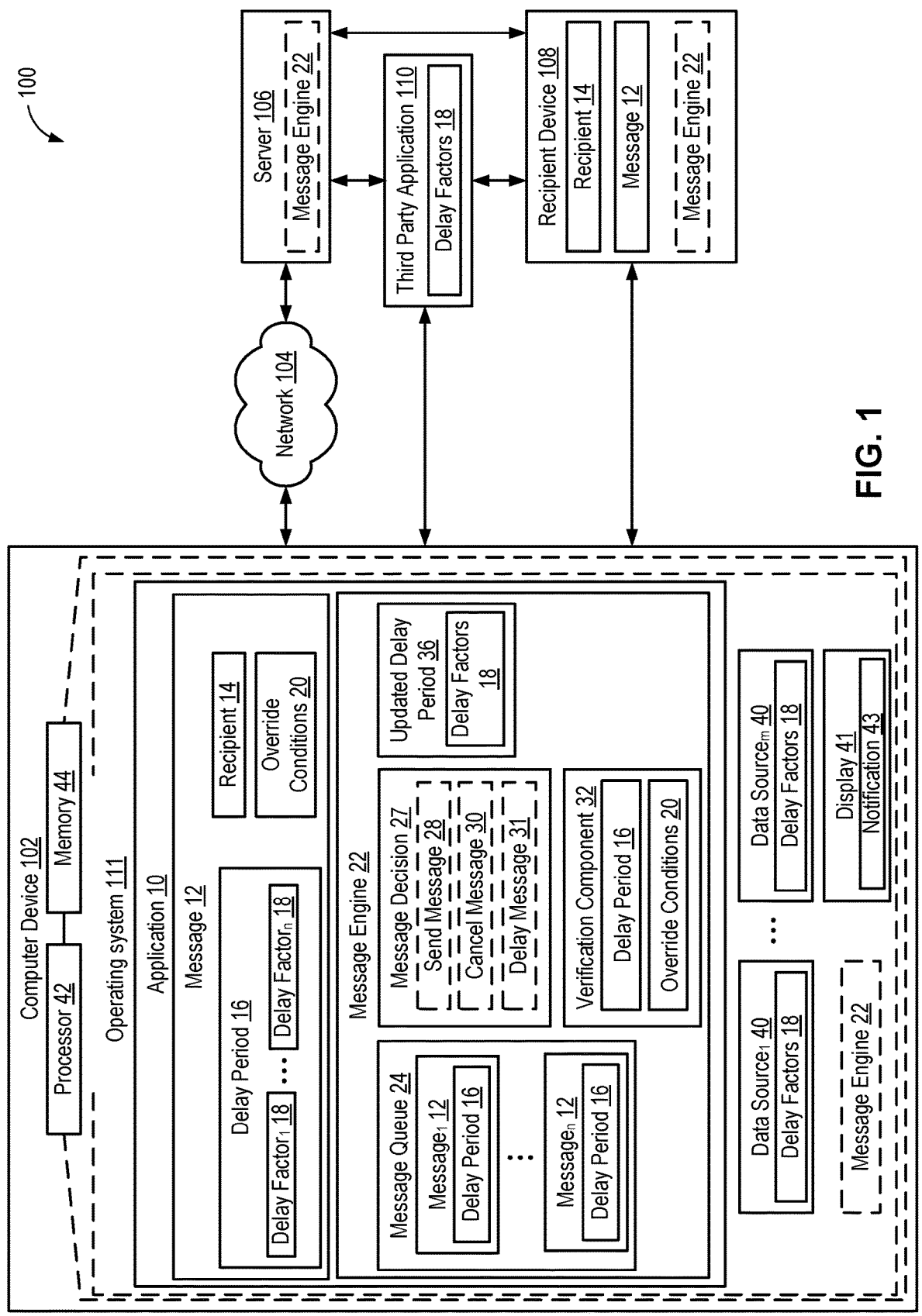
FIG. 1 is a schematic block diagram of an example computer device in accordance with an implementation of the present disclosure.

This disclosure relates to devices and methods for delaying sending and/or receiving of messages based on a delay period. The delay period may be based upon one or more delay factors, which may be fixed, dynamic or variable (e.g., send when a given condition occurs), or a combination of both, thereby leading to a fixed, variable, or potentially variable delay period. For example, a message may be delayed a set period of time (e.g., fixed delay period), or until a user arrives at a specified location (e.g., variable or dynamic delay period). In addition, the delay period may be based upon an anticipated or estimated value or state of a delay factor. For example, such an anticipated or estimated delay factor may include, but is not limited to, arrival of the sender and/or recipient at a location. For example, a user may be driving to a destination and may set a message to be delivered based upon an anticipated arrival time at the destination. For instance, using the disclosed devices and methods, a user driving a route having an estimated 5 hour drive time to a destination may configure a message, e.g., a reminder, before leaving and set it to be delivered to a recipient, e.g., a friend who lives at the destination, 15 minutes before the estimated arrival time. As such, in this case, the devices and methods enable the user to configure the message and set it up for delivery, for example, before the user leaves.

Additionally, in some implementations, the devices and methods may update the delay period based on changes in one or more delay factors. In this case, the delay factor(s) may be one or more periodically monitored dynamic or variable delay factors, including, but not limited to, schedule changes, changes in anticipated arrivals, location changes, delayed arrivals, interactions with individuals, and/or receiving additional documentation. For example, a user may be flying on an airplane and may choose to delay the sending of a message until a half hour before the anticipated arrival of the flight. The devices and methods may receive information that the flight is delayed forty five minutes, for example, from a third party flight tracking application. The devices and methods may adjust the delay period, e.g., in this case further delay the sending of the message, by forty five minutes based on the updated anticipated arrival time of the user. Another example may include a user setting a delay factor so that a message be held until the recipient is back in the office, originally anticipated to be at 10:00 am. However, traffic may delay the arrival of the recipient at the office. The devices and methods may receive an updated anticipated arrival time based on the current traffic patterns and may further delay the sending of the message based on the new anticipated arrival time of the recipient.

Further, in some implementations, the devices and methods may enable the user to configure an override condition, which may cancel the delay period and immediately send or cancel the sending of the message, further delay sending the message after completion of the delay period, or cancel the delivery of the message after completion of the delay period. For instance, a user may set a delay factor to delay sending the message by 30 minutes, but may also set an override condition, e.g., one of the recipients replying to a related earlier message (such as a message to which the user is replying with the 30 minute delayed message), which allows the 30 minute delay to be canceled and the message to be sent immediately or which allows the sending of the message to be canceled. In an additional or alternative implementation, for instance, the devices and methods may verify completion of the delay period and then may evaluate one or more override conditions before sending the message, e.g., to determine whether to send the message or to further delay the message or to cancel sending of the message. For example, a user may have delayed sending of a message in an e-mail thread until arrival at the office. However, during the delay period, other users on the e-mail thread may have responded to messages in the e-mail thread. The user may have identified other users responding to the messages in the e-mail thread as an override condition to prevent the sending of the delayed message.

Thus, the devices and methods may enable a user to configure a delay period based on one or more delay factors to delay sending a message, and/or to configure one or more override conditions that cancel or effectively extend the delay period, either during or after satisfying the delay period.

Referring now to FIG. 1, illustrated therein an example system 100 for use with delaying sending and/or receiving of messages 12. System 100 may have a computer device 102 that may send messages 12 to one or more recipient devices 108 via a network 104, such as a wireless and/or wired network. Computer device 102 may have one or more applications 10 executed by processor 42 and/or system memory 44 of computer device 102. Applications 10 may allow a user to compose one or more messages 12 to send to one or more recipients 14. Messages 12 may include, but are not limited to, e-mail messages, text messages, SMS messages, instant messages, and/or video messages.

Applications 10 may also allow a user to delay the sending and/or receiving of messages 12 for a delay period 16. The delay period 16 may be a fixed or variable time period selected by a user during which the message 12 may be held before the message is sent and/or received. For example, the user may enter in a time period to delay the message 12 and/or otherwise select a time in the future for sending the message 12. In addition, the delay period may be based upon an anticipated or estimated value or state of a delay factor.

The delay period 16 may also be determined based upon one or more (up to n, where n is an integer) delay factors 18 selected by a user and/or otherwise entered by the user. Example delay factors 18 may include, but are not limited to, arrival at a location, anticipated/estimated arrival at a location, anticipated/estimated departure from a location, an anticipated/estimated value, distance from a location, time from a location, messages received from specified contacts, messages sent to specified contacts, sender location, receiver location, anticipated/estimated arrival of a receiver at a location, and/or a geofenced area. In an implementation, a user may select a combination of delay factors 18 for determining the delay period 16 for delaying the sending of the message 12.

For example, a user on a weekend may want to reply to several work e-mails. However, in some cases, the user may want to be present in the office to have a conversation when the mail actually goes out. As such, the user may select a combination of delay factors 18 for the delay period 16 of sending the messages 12. For example, the user may select a delay factor 18 of the user arriving at the office. In addition, the user may also select a delay factor 18 of the recipient 14 arriving at the office so that the message 12 is only sent after both the user and the recipient 14 arrive at the office.

Another example may include a user who may want to send a text message to let a friend know the user is near their house. Before the user starts driving, the user may create a text message saying "I'm almost there!" and set a delay factor 18 for sending until the user is within a mile of their house. Thus, the message 12 may not be sent until the user is within a mile of their friend's house. In another example, the user may set a delay factor of ten minutes from a location. Thus, the message 12 may not be sent until the user is ten minutes from a specified location.

In addition, a user may delay sending a message 12 based on an arrival at a location and/or an estimated arrival time at a location by a user. For example, the message 12 may be delayed until ten minutes before the user is expected to arrive at work. Another example may include delaying the message until the recipient 14 arrives at a location. For example, a user may compose a message to a co-worker and delay the message until the co-worker arrives at work. In addition, a user may compose a message saying "welcome home" to a family member flying home and delay the sending of the message until the anticipated arrival of the family member's flight.

Another example may include delaying a message based on an estimated departure from a location. For example, a user may compose a message saying "I am on my way" and set a delay factor 18 for sending the message for when the user is leaving the house and/or expected to leave the house.

Another example may include a user may set up geofenced areas to define delaying messages. The geofenced areas may be entered manually and/or inferred by tracking user location. For example, when a user is within the geofenced area, the sending of the messages may be delayed until the user moves outside of the geofenced area.

Another example may include a user may delay the sending of messages to particular contacts. For example, a user may be on a business trip to an office location in Dublin. The user may want co-workers at the home office to receive messages when the user arrives back in the office. As such, the user may select to delay sending of messages to individuals back at the home office but may want to continue sending messages to individuals in the Dublin office.

Application 10 may also allow a user to identify one or more override conditions 20 that cancel or effectively extend the delay period 16, either during or after satisfying the delay period 16. As such, the one or more override conditions 20 may further delay and/or cancel the sending of messages 12. Override conditions 20 may include any filters and/or criteria a user may select to prevent the sending of messages 12 and/or further delay the sending of messages 12. Example override conditions 20 may include, but are not limited to, responses received from other individuals, interactions with the recipient(s), an availability status of the recipient(s), revised location information, revised estimated arrival time, receiving additional documentation, and/or signing off on a step in an enterprise process. The override conditions 20 may be used to determine when to send the message 12 and/or whether or not to send the message 12.

Computer device 102 may include an operating system 111 executed by processor 42 and/or system memory 44 of computer device 102. System memory 44 may be configured for storing data and/or computer-executable instructions defining and/or associated with operating system 111, and processor 42 may execute operating system 111. An example of system memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 111 may include applications 10. Application 10 may also include a message engine 22 that receives messages 12 and any delay periods 16 associated with the messages 12. In addition, message engine 22 may receive any override conditions 20 selected by the user to prevent the sending of the messages 12 and/or further delay the sending of messages 12. In an implementation, message engine 22 may be separate from application 10. For example, operating system 111, server 106, and/or recipient device 108 may include message engine 22.

Message engine 22 may have a message queue 24 that may hold the received messages 12 until the completion of the delay period 16 and/or the messages 12 are ready for transmission to recipient 14.

Message engine 22 may also determine whether to calculate an updated delay period 36 for messages 12 based upon one or more changes in delay factors 18 associated with the user, the recipient 14 and/or the messages 12. The delay factors 18 may be one or more periodically monitored dynamic or variable environment factors, e.g., having a value or state that may vary, and an updated delay period 36 may be set based on such value and/or state or a threshold relative to the value and/or state. Example environment factors may include, but are not limited to, schedule changes, changes in anticipated arrivals, changes in anticipated departures, location changes, delayed arrivals, interactions with individuals, and/or receiving additional documentation.

Message engine 22 may receive an indication of a state or value of the delay factors 18 from one or more (up to m, where m is an integer) data sources 40 executing on computer device 102. Data sources 40 may include, but are not limited to, a global positioning system (GPS), an accelerometer, cameras, sensors, call logs, message logs, contacts, vacation schedules, meeting schedules, flight tracking applications, weather applications, traffic conditions applications, travel applications, calendar applications, restaurant applications, and/or delivery service applications. In an implementation, data sources 40 may be third party applications 110 executing on and/or in communication with computer device 102 via network 104. The delay factors 18 may be pushed to message engine 22 from the one or more data sources 40. For example, message engine 22 may subscribe to updates from the various data sources 40 and/or third party applications 110 and determine whether to calculate an updated delay period 36 based upon the information received. In addition, message engine 22 may periodically check the data sources 40 and/or third party applications 110 and determine whether to calculate an updated delay period 36.

Message engine 22 may receive the delay factors 18 and may calculate an updated delay period 36 for the messages 12 based on the received delay factors 18. The updated delay period 36 may change the delay period 16 from a first value (e.g., an original and/or previous value for the delay period) to a second value. For example, if a user is driving/flying to a destination, the user may set a message 12 to be delivered after a delay period 16 and based on an estimated arrival time at the destination. For instance, prior to taking a 4 hour trip, a user can setup a message 12 to be delivered 1 hour prior to arrival, e.g., to notify a family member picking them up. Further, if a third party application 110 indicates a delay occurred in the drive/flight, then message engine 22 may use a current estimated arrival time to calculate an updated delay period 36 for sending of the message 12. For instance, at noon on a day of a trip where the user is expected to arrive at 5 p.m., the user can setup a message to be sent at 4 p.m., e.g., to remind a family member to pick them up at the airport. Message engine 22 may monitor the estimated arrival time based on, for example, received traffic pattern updates and calculate an updated delay period 36 for sending the message 12 based on the received traffic patterns. For example, in the above case, if the estimated arrival time changes from 5:00 pm to 5:30 pm, then the invention can update the time of sending the message to be 4:30 pm to achieve sending the message 1 hour before arrival at the location. As such, the delay period 16 associated with the message 12 may be variable and may change based upon a variety of delay factors 18 and/or a change in the estimated arrival time.

In addition, message engine 22 may make a message decision 27 whether to send the message 28, cancel the message 30, and/or further delay the message 31. Message engine 22 may include a verification component 26 that determines whether the delay period 16 for the message is completed and/or whether any override conditions 20 may exist to prevent the sending of the messages 12 and/or further delay the sending of messages 12. For example, verification component 26 may compare the current time to the delay period 16 to verify that the delay period 16 is completed. In an implementation, verification component 26 may verify that the one or more delay factors 18 associated with the message 12 have been met. For example, if the delay factor 18 indicated delaying the message 12 until the user arrived at the user's office, verification component 26 may verify that the location information of computer device 102 indicates that the user is located at the office by verifying that the GPS information of computer device 102 matches the location of the user's office. The location information may be based on device location (e.g., the location of computer device 102) and/or user location (e.g., a user signs into a work computer).

In addition, verification component 26 may determine whether any override conditions 20 exists to prevent the sending of message 12 and/or further delay the sending of message 12. Verification component 26 may use the delay factors 18 received from data sources 40 when determining whether any override conditions 20 have occurred. For example, an override condition 20 may include holding the sending of a message 12 if a conversation occurs with the recipient 14 during the delay period 16. Verification component 26 may determine that the user had a conversation with the recipient 14 during the delay period 16 by, for example, reviewing call logs of the computer device 102. In addition, verification component 26 may determine that the user sent an instant message to the recipient 14 during the delay period 16. Another example override condition 20 may include preventing the sending of a message 12 if the recipient 14 status is busy. Verification component 26 may receive the status information of the recipient 14 and determine whether the status is busy.

Message engine 22 may make a message decision 27 whether to send the message 28, cancel the message 30, and/or further delay the message 31 based at least upon the information received from verification component 26. For example, after verification component 26 verifies meeting a location condition for the completion of the delay period 16 and that someone else replies to a message in a message thread, one message decision 27 may be canceling the message 30 because someone else replied to a message in a thread to which the delayed message is replying during the delay period 16. Also, for example, another message decision 27 may be canceling the message 30 after achieving the location condition and the delay period 16 if certain criteria are or are not met. A further example may include a message decision 27 of further delaying the sending of the message 31, beyond the original delay period 16 after achieving the location condition, until certain criteria are or are not met. Another message decision 27 may include sending the message 28 based upon an updated estimated arrival time of the user. As such, message engine 22 may monitor a set of additional override conditions 20 to determine exactly when and/or whether or not to actually send the message 12.

In an implementation, when message engine 22 determines to cancel the message 30 and/or further delay the message 31, message engine 22 may provide a notification 43 on display 41 to a user. For example, the notification 43 may allow the user to confirm canceling the message and/or further delaying the message. In addition, the notification 43 may provide the user with an option for sending the message 12. The notification 43 may also prompt a user to create a new message 12.

When message engine 22 determines to send the message 28, message engine 22 may transmit the message 12 to the one or more recipient devices 108.

In an implementation, message engine 22 may be on server 106. For example, when a user is traveling by plane, the user may use application 10 to compose a message 12 to send while the user is flying to be delivered 1 hour prior to arrival, e.g., to notify a family member picking them up. Application 10 may transmit the message 12 to message engine 22 on server 106 for later transmission to recipient 14. In another implementation, message engine 22 may be on recipient device 108.

As such, message engine 22 may be used to delay the sending of messages 12 based upon a delay period 16 and/or to verify whether one or more override conditions 20 exists that may cancel or effectively extend the delay period, either during or after satisfying the delay period 16. In addition, message engine 22 may prompt a user to modify the delayed message when one or more override conditions 20 exists.

Figure 2:
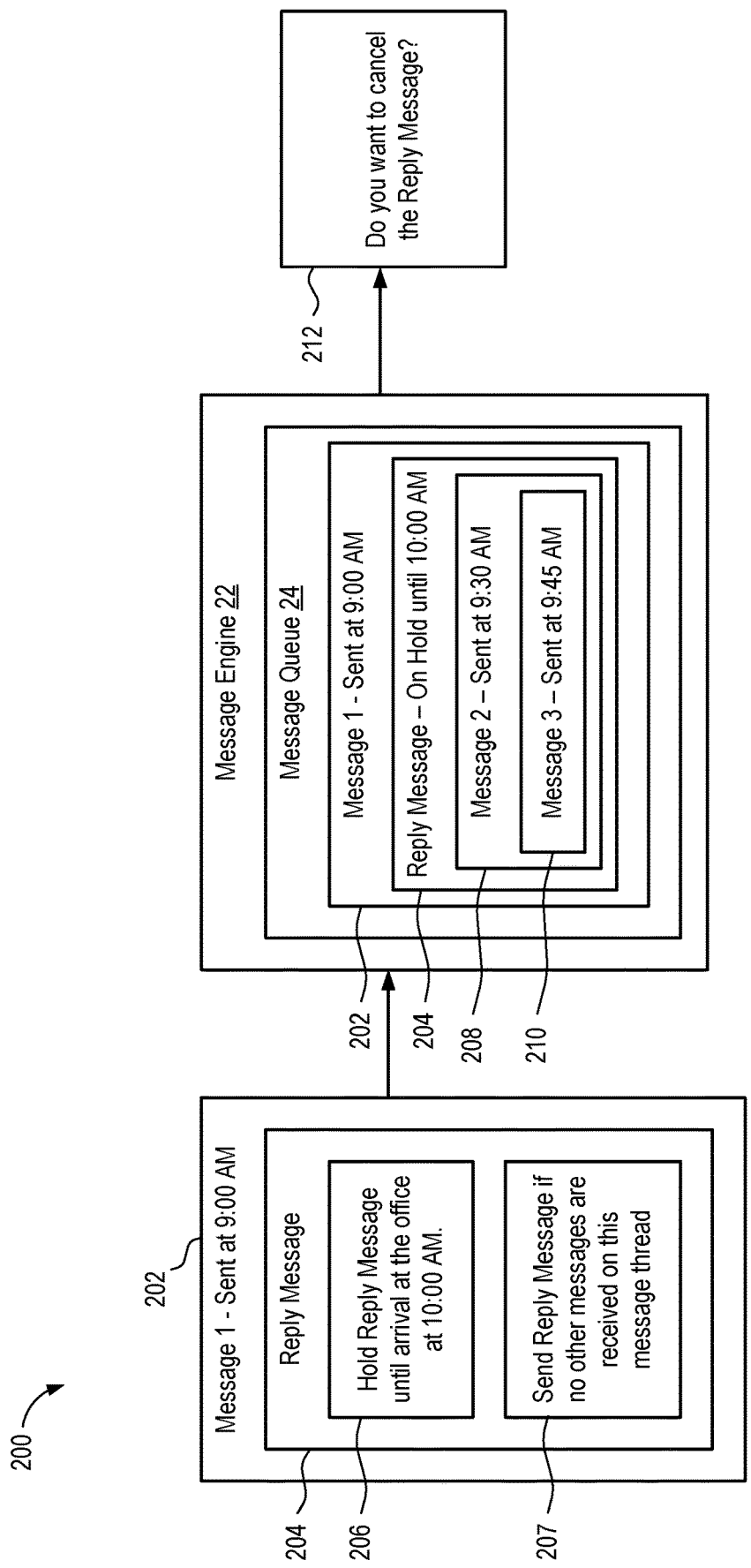
FIG. 2 is a schematic diagram of an example flow for verifying whether to send a message in accordance with an implementation of the present disclosure.

Referring now to FIG. 2, illustrated is an example flow 200 for verifying whether to send a message is discussed in connection with the description of the architecture of FIG. 1. Message engine 22 may receive a reply message 204 composed in response to a message 202 sent at 9:00 a.m. The reply message 204 may have a delay factor 206 to hold the replay message 204 until the user arrives at the office at 10:00 a.m. In addition, the reply message 204 may also have an override condition 207 to send the reply message 204 if no other messages are received on this message thread.

Message engine 22 may store the reply message 204 in a message queue 24 during the delay period indicated by the delay factor 206. During the delay period, message engine 22 may receive a second message 208 and a third message 210 in reply to the first message 202. At 10:00 a.m. prior to sending the replay message 204, message engine 22 may determine that the override condition 207 had been met, e.g., the second message 208 and the third message 210 had been received during the delay period. As such, message engine 22 may send a notification 212 to the user to ask the user whether the user wants to cancel the reply message 204.

Figure 3:
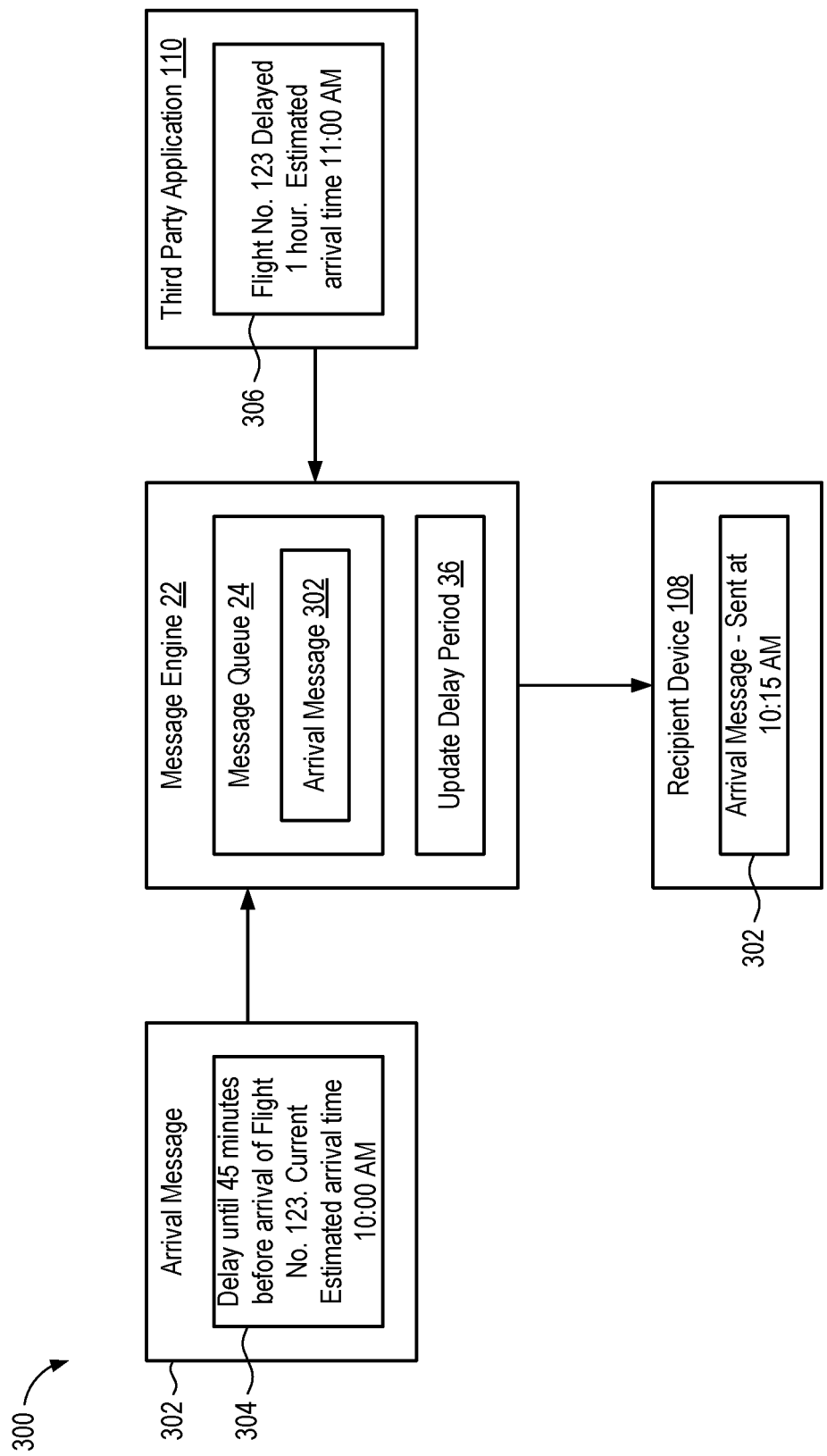
FIG. 3 is a schematic diagram of an example flow for updating the delay period for a message in accordance with an implementation of the present disclosure.

Referring now to FIG. 3, illustrated is an example flow 300 for updating the delay period for a message is discussed in connection with the description of the architecture of FIG. 1. Prior to taking a flight, a user may compose an arrival message 302. The user may select a delay factor 304 to delay the sending of the message until forty five minutes before the arrival of the flight. In addition, the user may indicate that the current estimated arrival time of the flight is 10:00 a.m.

Message engine 22 may receive the arrival message 302 and may store the arrival message 302 in message queue 24 until forty five minutes before the arrival of the flight. In addition, message engine 22 may receive information 306 from a third party application 110 indicating that the flight is delayed one hour and the new estimated arrival time is 11:00 a.m. Message engine 22 may calculate an updated delay period 36 for the arrival message 302 based upon the information 306 received from the third party application 110. At 10:15 message engine 22 may transmit the arrival message 302 to recipient device 108 based upon the new estimated arrival time of the flight.

Figure 4:
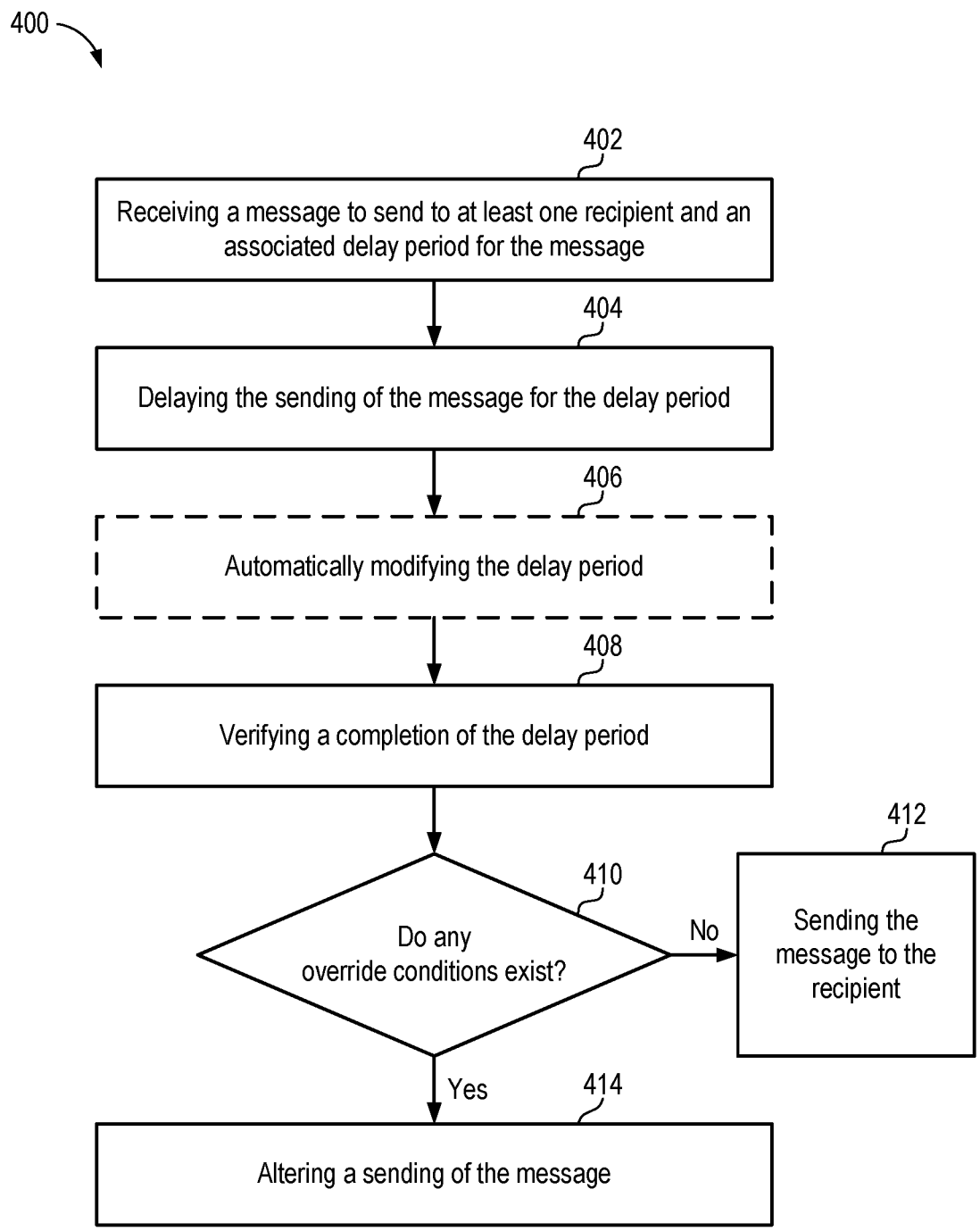
FIG. 4 is a flow chart of an example method for verifying whether to send a message in accordance with an implementation of the present disclosure.

Referring now to FIG. 4, illustrated is an example method flow 400 for verifying whether to send a message (12) for use with hardware of a computer device 102 (FIG. 1) is discussed in connection with the description of the architecture of FIG. 1.

At 402, method 400 may include receiving a message to send to at least one recipient and an associated delay period for the message. For example, message engine 22 may receive one or more messages 12 to send to one or more recipients 14. In addition, message engine 22 may receive any delay periods 16 associated with the messages 12.

The delay period 16 may be a fixed or variable time period selected by a user during which the message 12 may be held before the message is sent and/or received. For example, the user may enter in a time period to delay the message 12 and/or otherwise select a time in the future for sending the message 12. In addition, the delay period may be based upon an anticipated or estimated value or state of a delay factor.

The delay period 16 may also be determined based upon one or more (up to n, where n is an integer) delay factors 18 selected by a user and/or otherwise entered by the user. Example delay factors 18 may include, but are not limited to, arrival at a location, anticipated/estimated arrival at a location, anticipated/estimated departure from a location, an anticipated/estimated value, distance from a location, time from a location, messages received from specified contacts, messages sent to specified contacts, sender location, receiver location, anticipated/estimated arrival of a receiver at a location, and/or a geofenced area. In an implementation, a user may select a combination of delay factors 18 for determining the delay period 16 for delaying the sending of the message 12.

In addition, message engine 22 may receive any override conditions 20, which may cancel the delay period and immediately send or cancel the sending of the message, further delay sending the message after completion of the delay period, or cancel the delivery of the message after completion of the delay period. For example, a user may identify one or more override conditions 20 that cancels or effectively extends the delay period 16, either during or after satisfying the delay period 16. As such, the one or more override conditions 20 may further delay and/or cancel the sending of messages 12. Override conditions 20 may include any filters and/or criteria a user may select to prevent the sending of messages 12 and/or further delay the sending of messages 12. Example override conditions 20 may include, but are not limited to, responses received from other individuals, interactions with the recipient(s), an availability status of the recipient(s), revised location information, revised estimated arrival time, receiving additional documentation, and/or signing off on a step in an enterprise process. The override conditions 20 may be used to determine when to send the message 12 and/or whether or not to send the message 12.

At 404, method 400 may include delaying the sending of the message for the delay period. Message engine 22 may have a message queue 24 that may hold the received messages 12 until the completion of the delay period 16 and/or the messages 12 are ready for transmission to recipient 14.

At 406, method 400 may optionally include automatically modifying the delay period. Message engine 22 may also determine whether to calculate an updated delay period 36 for messages 12 based upon one or more changes in delay factors 18 associated with the user, the recipient 14 and/or the messages 12. The delay factors 18 may be one or more periodically monitored dynamic or variable environment factors, e.g., having a value or state that may vary, and an updated delay period 36 may be set based on such value and/or state or a threshold relative to the value and/or state. Example environment factors may include, but are not limited to, schedule changes, changes in anticipated arrivals, changes in anticipated departures, location changes, delayed arrivals, interactions with individuals, and/or receiving additional documentation.

Message engine 22 may receive an indication of a state or value of the delay factors 18 from one or more (up to m, where m is an integer) data sources 40 executing on computer device 102. Data sources 40 may include, but are not limited to, a global positioning system (GPS), an accelerometer, cameras, sensors, call logs, message logs, contacts, vacation schedules, meeting schedules, flight tracking applications, weather applications, traffic conditions applications, travel applications, calendar applications, restaurant applications, and/or delivery service applications. In an implementation, data sources 40 may be third party applications 110 executing on and/or in communication with computer device 102 via network 104. The delay factors 18 may be pushed to message engine 22 from the one or more data sources 40. For example, message engine 22 may subscribe to updates from the various data sources 40 and/or third party applications 110 and determine whether to calculate an updated delay period 36 based upon the information received. In addition, message engine 22 may periodically check the data sources 40 and/or third party applications 110 and determine whether to calculate an updated delay period 36.

Message engine 22 may receive the delay factors 18 and may calculate an updated delay period 36 for the messages 12 based on the received delay factors 18. The updated delay period 36 may change the delay period 16 from a first value (e.g., an original and/or previous value for the delay period) to a second value. For example, if a user is driving/flying to a destination, the user may set a message 12 to be delivered after a delay period 16 and based on an estimated arrival time at the destination. For instance, prior to taking a 4 hour trip, a user can setup a message 12 to be delivered 1 hour prior to arrival, e.g., to notify a family member picking them up. Further, if a third party application 110 indicates a delay occurred in the drive/flight, then message engine 22 may use a current estimated arrival time to calculate an updated delay period 36 for sending of the message 12.

At 408, method 400 may include verifying a completion of the delay period. For example, verification component 26 may compare the current time to the delay period 16 to verify that the delay period 16 is completed. In an implementation, verification component 26 may verify that the one or more delay factors 18 associated with the message 12 have been met. For example, if the delay factor 18 indicated delaying the message 12 until the user arrived at the user's office, verification component 26 may verify that the location information of computer device 102 indicates that the user is located at the office by verifying that the GPS information of computer device 102 matches the location of the user's office. The location information may be based on device location (e.g., the location of computer device 102) and/or user location (e.g., a user signs into a work computer).

At 410, method 400 may include determining whether any override conditions exist. For example, verification component 26 may determine whether any override conditions 20 exists to prevent the sending of message 12 and/or further delay the sending of message 12. Verification component 26 may use the delay factors 18 received from data sources 40 when determining whether any override conditions 20 have occurred. For example, an override condition 20 may include holding the sending of a message 12 if a conversation occurs with the recipient 14 during the delay period 16. Verification component 26 may determine that the user had a conversation with the recipient 14 during the delay period 16 by, for example, reviewing call logs of the computer device 102. In addition, verification component 26 may determine that the user sent an instant message to the recipient 14 during the delay period 16. Another example override condition 20 may include preventing the sending of a message 12 if the recipient 14 status is busy. Verification component 26 may receive the status information of the recipient 14 and determine whether the status is busy.

Message engine 22 may make a message decision 27 whether to send the message 28, cancel the message 30, and/or further delay the message 31 based at least upon the information received from verification component 26.

At 412, method 400 may include sending the message to the recipient when it is determined that override conditions did not occur to prevent the sending of the message. When message engine 22 determines to send the message, message engine 22 may transmit the message 12 to the one or more recipient devices 108.

At 414, method 400 may include altering a sending of the message when an override condition exists. For example, after verification component 26 verifies meeting a location condition for the completion of the delay period 16 and that someone else replies to a message in a message thread, one message decision 27 may be canceling the message 30 because someone else replied to a message in a thread to which the delayed message is replying during the delay period 16. Also, for example, another message decision 27 may be canceling the message 30 after achieving the location condition and the delay period 16 if certain criteria are or are not met. A further example may include a message decision 27 of further delaying the sending of the message 31, beyond the original delay period 16 after achieving the location condition, until certain criteria are or are not met. As such, message engine 22 may monitor a set of additional override conditions 20 to alter a sending of the message 12 and/or to determine exactly when and/or whether or not to actually send the message 12.

In an implementation, when message engine 22 determines to cancel the message 30 and/or further delay the message 31, message engine 22 may provide a notification 43 on display 41 to a user. For example, the notification 43 may allow the user to confirm canceling the message and/or further delaying the message. In addition, the notification 43 may provide the user with an option for sending the message 12. The notification 43 may also prompt a user to create a new message 12.

As such, the devices and methods may enable a user to configure a delay period based on one or more delay factors to delay sending a message, and/or to configure one or more override conditions that cancel or effectively extend the delay period, either during or after satisfying the delay period.

Figure 5:
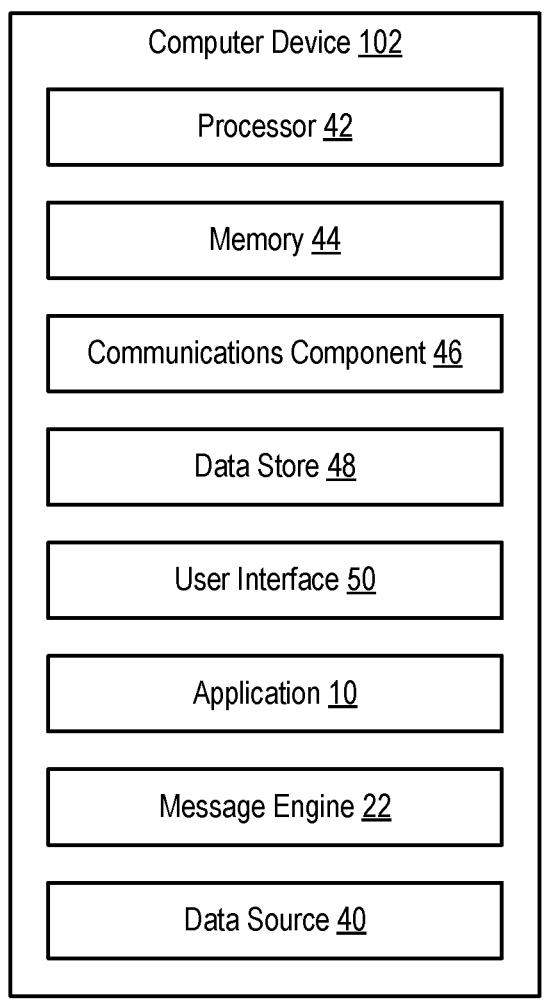
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer device 102 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 42 and memory 44 may include and execute operating system 111 (FIG. 1).

Further, computer device 102 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer device 102 may include a data store 48, which can be any suitable combination of hardware and/or software, that provides for mass storage of information, databases, and programs employed in connection with implementations described herein. For example, data store 48 may be a data repository for applications 10 (FIG. 1), message engine 22 (FIG. 1), and/or data source 40 (FIG. 1).

Computer device 102 may also include a user interface component 50 operable to receive inputs from a user of computer device 102 and further operable to generate outputs for presentation to the user. User interface component 50 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, message engine 22, and/or data source 40. In addition, processor 42 executes applications 10, message engine 22, and/or data source 40 and memory 44 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory;
    an operating system in communication with the memory and the processor, wherein the operating system is operable to:
        delay a sending of a message to at least one recipient based at least upon a delay period for the message, wherein the message is part of a message thread of a plurality of messages;
        verify a completion of the delay period;
        determine whether at least one override condition exists, wherein the at least one override condition includes criteria selected to further delay the sending of the message after the completion of the delay period;
        wait for confirmation to cancel or further delay the message in response to the at least one override condition occurring, wherein the at least one override condition includes receiving a reply to at least one message of the plurality of messages within the message thread; and
        alter the sending of the message in response to the confirmation.

2. The computer device of claim 1, wherein the operating system is further operable to cancel sending the message when the at least one override condition occurred.

3. The computer device of claim 1, wherein the operating system is further operable to:
    prompt a user to confirm whether to send the message when the at least one override condition occurred.

4. The computer device of claim 1, wherein the operating system is further operable to send the message when the at least one override condition did not occur.

5. The computer device of claim 1, wherein the delay period is based upon an anticipated arrival time at a location.

6. The computer device of claim 1, wherein the delay period is based upon one or more delay factors.

7. The computer device of claim 6, wherein the operating system is further operable to verify the completion of the delay period by verifying the one or more delay factors are met.

8. The computer device of claim 6, wherein the one or more delay factors comprise one or more environment factors, wherein the operating system is further operable to:
    receive an indication of a value of the one or more environment factors; and
    automatically update the delay period based on the one or more environment factors.

9. The computer device of claim 8, wherein the operating system receives the one or more environment factors from one or more of at least one data source on the computer device and a third party application in communication with the computer device.

10. The computer device of claim 1, wherein the at least one override condition includes receiving responses from other individuals.

11. The computer device of claim 1, wherein the at least one override condition includes interactions with the at least one recipient.

12. The computer device of claim 1, wherein the at least one override condition includes receiving additional documentation.

13. The computer device of claim 1, wherein the operating system is further operable to:
prompt a user to create a new message in response to the confirmation; and
send the new message.

14. A method for verifying whether to send a message from a computer device, comprising:
delaying, at an operating system executing on the computer device, a sending of the message to at least one recipient based at least upon a delay period for the message, wherein the message is part of a message thread of a plurality of messages;
verifying a completion of the delay period;
determining whether at least one override condition exists, wherein the at least one override condition includes criteria selected to further delay the sending of the message after the completion of the delay period;
waiting for confirmation to cancel or further delay the message in response to the at least one override condition occurring, wherein the at least one override condition includes receiving a reply to at least one message of the plurality of messages within the message thread; and
altering the sending of the message in response to the confirmation.

15. The method of claim 14, further comprising:
canceling sending the message when the at least one override condition occurred.

16. The method of claim 14, further comprising
prompting a user to confirm whether to send the message when the at least one override condition occurred.

17. The method of claim 14, further comprising:
sending the message when the at least one override condition did not occur.

18. The method of claim 14, wherein the delay period is based upon an anticipated arrival time at a location.

19. The method of claim 14, wherein the delay period is based upon one or more delay factors.

20. The method of claim 19, wherein verifying the completion of the delay period further comprises verifying the one or more delay factors are met.

21. The method of claim 19, wherein the one or more delay factors comprise one or more environment factors, and wherein the method further comprises:
receiving an indication of a value of the one or more environment factors; and
automatically updating the delay period based on the one or more environment factors.

22. The method of claim 21, wherein the one or more environment factors are received from one or more of at least one data source on the computer device and a third party application in communication with the computer device.

23. A non-transitory computer-readable medium storing instructions executable by a computer device, comprising:
at least one instruction for causing the computer device to delay a sending of a message to at least one recipient based at least upon a delay period for the message, wherein the message is part of a message thread of a plurality of messages;
at least one instruction for causing the computer device to verify a completion of the delay period;
at least one instruction for causing the computer device to determine whether at least one override condition exists, wherein the at least one override condition includes criteria selected to further delay the sending of the message after the completion of the delay period;
at least one instruction for causing the computer device to wait for confirmation to cancel or further delay the message in response to the at least one override condition occurring, wherein the at least one override condition includes receiving a reply to at least one message of the plurality of messages within the message thread; and
at least one instruction for causing the computer device to alter the sending of the message in response to the confirmation.

* * * * *